United States Patent [19]

Okano et al.

[11] Patent Number: 5,190,591
[45] Date of Patent: Mar. 2, 1993

[54] LANGMUIR-BLODGETT FILM FORMING APPARATUS

[75] Inventors: Makoto Okano; Toshiyuki Miyadera; Fumio Matsui, all of Saitama, Japan

[73] Assignee: Pioneer Electronic Corporation, Tokyo, Japan

[21] Appl. No.: 726,083

[22] Filed: Jul. 5, 1991

[30] Foreign Application Priority Data

Jan. 17, 1991 [JP] Japan ................................. 3-3766

[51] Int. Cl.$^5$ ............................................. B05C 3/09
[52] U.S. Cl. ................................... 118/667; 118/692; 118/64; 118/402; 118/429; 427/430.1
[58] Field of Search ................. 118/667, 64, 402, 692, 118/429; 427/430.1

[56] References Cited

U.S. PATENT DOCUMENTS

| 3,892,665 | 7/1975 | Steigelmann et al. | 264/41 X |
| 4,495,889 | 1/1985 | Riley | 118/667 X |
| 4,646,678 | 3/1987 | Grunfeld | 118/667 |
| 4,785,762 | 11/1988 | Miyazaki et al. | 118/402 |
| 4,827,867 | 5/1989 | Takei et al. | 118/667 X |
| 5,006,374 | 4/1991 | Wakayama et al. | 118/402 |
| 5,021,268 | 6/1991 | Khanarian et al. | 118/402 X |

FOREIGN PATENT DOCUMENTS 61-137322 6/1986 Japan .................................. 118/409
63-32922 2/1988 Japan .................................. 118/667

Primary Examiner—W. Gary Jones
Assistant Examiner—Todd J. Burns
Attorney, Agent, or Firm—Sughrue, Mion, Zinn, Macpeak & Seas

[57] ABSTRACT

A Langmuir-Blodgett (LB) film forming apparatus has a packing unit for orientating and packing a sample which is a composition for forming a monomolecular film developed on a subphase stored in a first tank, a sampling unit for sampling the orientated and packed monomolecular film on a substrate, and an outer casing enclosing the packing unit and sampling unit. The packing unit has a second tank in which a circulating solution is stored and the first tank is disposed in the solution. A temperature of the circulating solution in the second tank is controlled by a first controller and a temperature of atmosphere enclosed by the casing is controlled by a second controller. The first and second controllers are synchronously operated. The substrate is disposed above the subphase in a vertical attitude. The sampling unit includes a pressure detector for detecting a pressure of the packed monomolecular film and the packing unit includes a barrier driving means which is operatively connected to the pressure detector so that the movement of the barrier stops when a detected pressure reaches a predetermined value.

7 Claims, 1 Drawing Sheet

LANGMUIR-BLODGETT FILM FORMING APPARATUS

BACKGROUND OF THE INVENTION

The present invention relates to an apparatus for forming an ultrathin film called a Langmuir-Blodgett Film (LB film).

Recently a method of constructing, an organic ultrathin film, known as an LB film, has quickly become popular as a thin film formation technique. The LB film has various advantages, such as good molecular controllability, provision of and therefor it can be adapted to a wide variety of; usages and is easily prepared under normal temperature and pressure. The application thereof has been therefore researched in various fields.

A conventional apparatus or system for forming or preparing the LB film consists of, for example, a packing unit, for compressing a sample developed on the surface of subphase solution stored in a first tank by moving a barrier along the upper surface of the subphase solution, called merely "subphase" hereinafter, and a sampling unit for sampling a monomolecular film of the sample, which is oriented and packed by the packing unit, on a surface of a film carrier plate as a substrate. The packing unit is provided with a second tank for regulating the temperature of the subphase, a sensor for detecting the temperature of the solution in the second tank and a temperature controller for regulating the temperature of the solution in the second tank in response to a signal transmitted from the sensor. Accordingly, the packing unit performs only the temperature control of the subphase.

In such a conventional apparatus, however, attention has not been paid to the temperature of the ambient atmosphere, surrounding the apparatus, thus providing the following problems.

Namely, when the temperature of the subphase increases over the ambient temperature, steam is generated in an extreme case, and steam is condensed on the surface of the substrate preliminarily disposed above the subphase for sampling the monomolecular film. This results in poor sampling of the monomolecular film because of dew condensation formed on the substrate. On the other hand, when the temperature of the subphase becomes well below ambient temperature of the ambient atmosphere, dew condensation is formed on the peripheral surface of the first tank in which the subphase is stored, resulting in that the barrier cannot sufficiently compress, i.e. pack, the sample of the subphase. This causes insufficient control of the film pressure.

SUMMARY OF THE INVENTION

An object of the present invention is to substantially eliminate the defects or problems encountered in the prior art and to provide an LB film forming apparatus capable of preventing dew condensation on the film carrier plate, i.e. substrate, exactly measuring the film pressure and accurately sampling the LB film.

This and other objects can be achieved according to the present invention by providing a Langmuir-Blodgett (LB) film forming apparatus consisting of a packing unit for orienting and packing a sample which is a composition of forming monomolecular film developed on a subphase stored in a first tank, a sampling unit for sampling the orientated and packed monomolecular film on a substrate, and an outer casing covering the packing unit and sampling unit, the packing unit has a second tank in which a solution is stored, the first tank is disposed in the solution, and a first controller controls the temperature of the solution in the second tank, the casing is provided with a second controller for controlling a temperature of the atmosphere enclosed by the casing, the first and second controllers are synchronously operated.

In a preferred embodiment, the first controller consists of a first sensor for detecting a temperature of the solution in the second tank and a first processor for controlling the temperature of the solution in response to a signal transmitted from the first sensor. The second controller consists of a second sensor for detecting a temperature of the atmosphere enclosed by the casing and a second processor for controlling the temperature of the atmosphere in response to a signal from the second sensor the first and second controllers are operated in synchronism with each other.

The first sensor is immersed in the solution in the second tank and the second sensor is disposed in the atmosphere enclosed by the casing.

The substrate is disposed above the subphase in a vertical attitude. The sampling unit includes a pressure detector for detecting a pressure of the oriented and packed monomolecular film and the packing unit includes a barrier driving means which is operatively connected to the pressure detector so that the movement of the barrier stops when a detected pressure reaches a predetermined value.

According to the LB film forming apparatus of the structure described above, the sample of monomolecular film composition developed on the subphase is oriented and packed by the barrier till the pack film pressure reaches a predetermined value. Thereafter, the substrate is lowered into the subphase for transferring the film on the substrate. This operation is repeated so as to form an accumulated film on the substrate. During these operation, the temperature for controlling the temperature of the subphase and the temperature of the atmosphere covering the substrate are controlled so as to be within a range of predetermined temperature errors.

BRIEF DESCRIPTION OF THE PREFERRED EMBODIMENT

Figure 1:
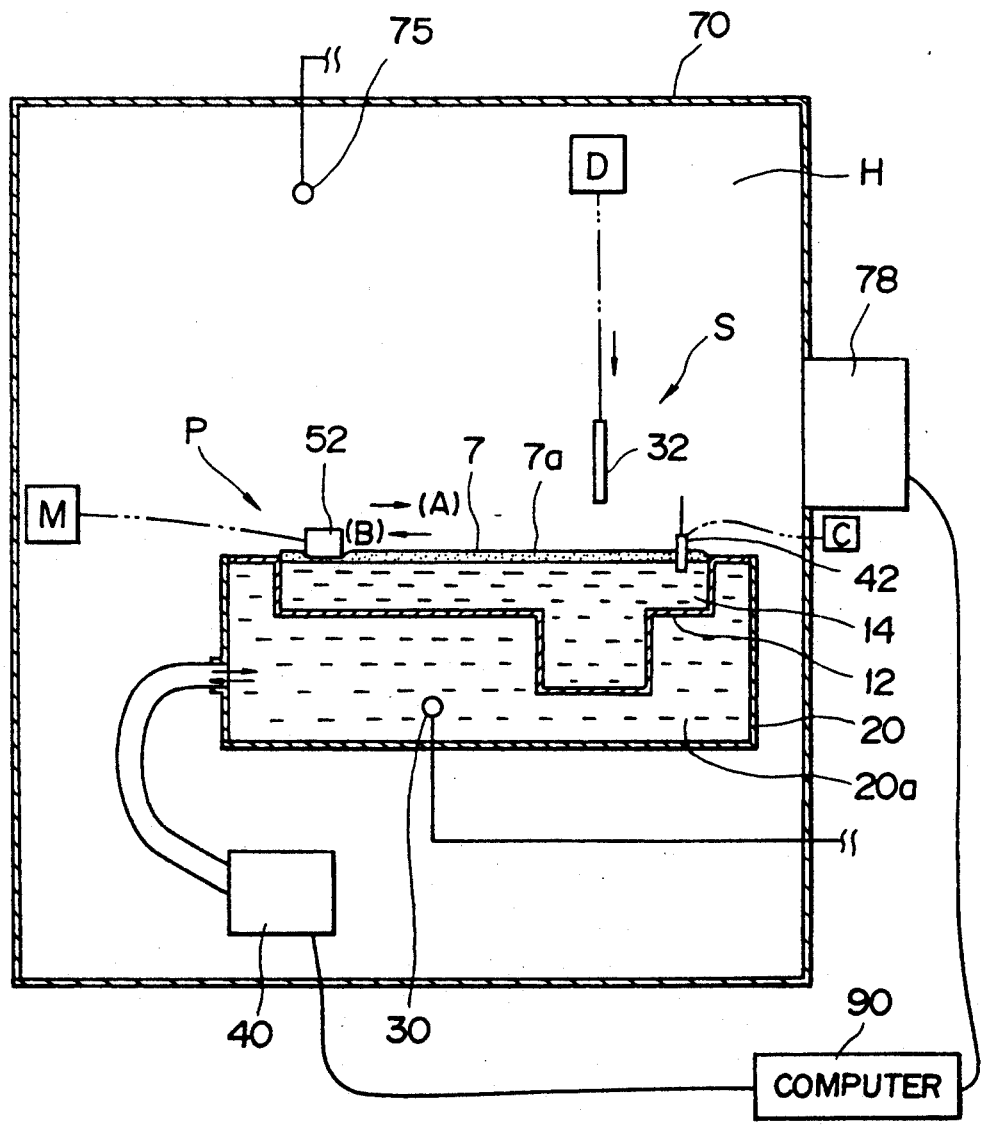
FIG. 1 is a sectional view of an LB film forming apparatus according to the present invention.

Referring to FIG. 1, an LB film forming apparatus according to the present invention generally consist of a packing unit P for compressing, i.e. packing, a sample 7 which is composition for forming a monomolecular film 7a and a sampling unit S for sampling the monomolecular film 7a oriented and packed by the packing unit P.

The packing unit P includes a first tank 12 in which a solution of a subphase, called merely "subphase 14" hereinafter in this specification, is stored and a barrier 52 disposed on an upper surface of the subphase 14 with a lower portion of the barrier 52 being dipped therein. The packing unit P further includes a second tank 20 for regulating a temperature of the subphase 14, a sensor 30 for detecting a temperature of a solution (or circulating solution) 20a in the second tank 20 and a first temperature controller 40 for controlling the temperature of the solution 20a in the second tank 20 in response to a signal transmitted from the sensor 30.

The first and second tanks 12 and 20 are both of a box shape and the first tank 12 is disposed in the second tank 20. In the first tank 12, the subphase 14, having preliminarily adjusted or arranged pH and salt concentration, is stored. The sample 7 as the monomolecular film formation composition is disposed on the upper surface of the subphase 14 in a floating manner.

The barrier 52 is utilized for applying a predetermined constant pressure to the floating sample 7 to orientate and pack the same and has a substantially rectangular outer configuration having a length approximately equal to the width of the first tank 12 for completely packing the sample 7. The barrier 52 is operatively connected to a barrier drive mechanism M so as to move the barrier forwardly and backwardly along the upper surface of the subphase 14 as shown by arrows A and B.

The sample 7 oriented and packed by the barrier 52 in the described manner is controlled by a packing control unit including a detecting device and a controller C. In the illustrated embodiment, the detecting device consists of a surface pressure detecting plate 42 for measuring the surface pressure, i.e. sample film pressure, disposed at one surface end side, righthand side in FIG. 1, with a lower portion thereof being dipped in the subphase 14. A signal detected by the surface pressure detecting plate 42 is transmitted to the controller C.

The controller C controls a displacement of the barrier 52 along the surface of the subphase 14 until the surface pressure detecting plate 42 detects the predetermined film pressure.

The inside of the second tank 20 disposed below the first tank 12 is usually filled up with the circulating solution 20a, and the sensor 30 for detecting the temperature of the circulating solution 20a is immersed therein. This sensor 30 may be called a first sensor 30 for the reason described later. The control of the temperature of the circulating solution 20a in the second tank 20 is performed by the first temperature controller 40 in response to the signal transmitted from the first sensor 30.

The monomolecular film 7a of the sample 7 oriented and packed on the surface of the subphase 14 by the packing unit P is sampled by the sampling unit S. The sampling unit S of the illustrated embodiment consists of a film carrier plate 32 as a substrate for directly sampling the monomolecular film 7a on the outer surface thereof from the upper surface of the subphase 14 and a driving mechanism D for elevating the substrate 32. The illustrated embodiment represents a vertical sampling method in which the substrate 32 is located vertically with respect to the film surface of the monomolecular film 7a and the monomolecular film 7a is transferred from the solution surface to the substrate 32 by vertically elevating the same. Namely, when the substrate 32 is lowered, as viewed, and dipped into the first tank 12, the monomolecular film 7a sticks to the surface of the substrate 32 and, thereafter, the substrate 32 is lifted upwardly by the driving mechanism D with the monomolecular film 7a sticking thereto.

The LB film forming apparatus of the present invention is further provided with an outer casing 70 for covering the packing unit P and the sampling unit S.

The casing 70 is equipped with a second sensor 75, disposed inside the casing 70, for detecting a temperature of an atmosphere H covered by the casing 70 and a second controller 78 attached to the casing 70 for regulating the temperature of the atmosphere H in response to a signal transmitted from the second sensor 75. The second controller 78 includes various known elements for air conditioning for increasing or decreasing the temperature of the atmosphere H. The second controller 78 is connected to the first controller 40 through a computer 90, and the second controller 78 is controlled in synchronism with the first controller 40 to thereby control the temperature of the second tank 20 and the atmosphere H to be within a range of predetermined temperature errors.

According to the LB film forming apparatus of the structure described above, the temperature Th of the atmosphere H and the temperature Tt of the solution 20a in the second tank 20 are preliminariy set to $Th = Tt \pm 2°$ C., for example. At this time, the second temperature controller 78 is then controlled in synchronism with the first temperature controller 40 so that the temperatures Tt and Th are within the range of the predetermined temperature errors to substantially eliminate the difference in temperatures between the atmosphere H and the subphase 14. Under this condition, the barrier 52 is moved to compress or pack the sample 7 in the arrowed direction A along the upper surface of the subphase 14 till the packed film pressure reaches the predetermined value. When the film pressure reaches the predetermined value, the barrier 52 stops. This control is performed by the controller C, and after the desired sample film 7a is formed, the substrate 32 arranged vertically with respect to the film surface is lowered and immersed into the first tank 12. When the dipped substrate 32 is lifted, the film 7a is transferred to the surface of the substrate 32. By repeating the process described above, an accumulated film (or built-up film) having a predetermined pattern is formed on the surface of the substrate 32.

As described hereinbefore, according to the present invention, the LB film forming apparatus consists the packing unit, sampling unit and the outer casing covering both the units and the temperatures of the solution in the second tank and of the atmosphere in the casing can be synchronously controlled, so that the dew condensation on the film carrier plate caused in the conventional apparatus due to the temperature difference can be effectively prevented, thus accurately measuring the film pressure and exactly sampling the film.

What is claimed is:

1. A Langmuir-Blodgett (LB) film forming apparatus comprising:
   a first tank having a subphase contained therein;
   a packing unit positioned on said first tank so as to orient and pack a sample which is a composition for forming a monomolecular film developed on said subphase;
   a sampling unit positioned so as to sample the oriented and packed monomolecular film on a substrate;
   said packing unit comprising a second tank in which a solution is stored, said first tank being disposed in said solution of said second tank; an outer casing enclosing said packing unit, said sampling unit, and said first and second tank; a first controller for controlling a temperature of the solution in said second tank; and said outer casing being provided with a second controller for controlling an ambient temperature in said outer casing, said first and second controllers being operatively coupled to one another so as to maintain a temperature of the solution substantially the same as said ambient temperature in said outer casing.

2. An apparatus according to claim 1, wherein said first controller comprises a first sensor for detecting the temperature of said solution in said second tank and a first controlling device for controlling the temperature of said solution in response to a signal transmitted from said first sensor, and wherein said second controller comprises a second sensor for detecting said ambient temperature in said outer casing and a second controlling device for controlling said ambient temperature in response to a signal from said second sensor, said first and second controlling devices being operated in synchronism with each other.

3. An apparatus according to claim 2, wherein said solution stored in said second tank is circulated.

4. An apparatus according to claim 2, wherein said subphase in said first tank has a predetermined pH and salt concentration.

5. An apparatus according to claim 2, wherein said first sensor is immersed in said solution of said second tank and said second sensor is disposed in an atmosphere enclosed by said outer casing.

6. An apparatus according to claim 1, wherein said substrate is disposed above said subphase so as to extend in a vertical direction, and said sampling unit includes a driver operatively connected to said substrates so as to move the substrate so as to immerse the same into the subphase.

7. An apparatus according to claim 1, wherein said sampling unit includes a pressure detector for detecting a pressure of said monomolecular film and said packing unit includes a barrier driving device which is operatively connected to said pressure detector so that the movement of a barrier associated with said packing unit stops when a detected pressure reaches a predetermined value.

* * * * *